United States Patent  [15] 3,655,408
Charier-Vadrot  [45] Apr. 11, 1972

[54] AROMATIC SUBSTANCES OBTAINED FROM ANIMAL OR VEGETABLE TISSUES

[72] Inventor: Pierre L. J. Charier-Vadrot, 1, route de Lagnes, 84 Cavaillon, France

[22] Filed: May 9, 1969

[21] Appl. No.: 823,531

[30] Foreign Application Priority Data

May 10, 1968 France....................22272

[52] U.S. Cl.................99/140 R, 99/22, 99/100 R, 99/110, 99/204, 99/208
[51] Int. Cl..........................................A23l 1/28
[58] Field of Search..............99/22, 140, 110, 112, 100, 99/103, 156, 159, 1, 199, 204, 208, 107, 7; 195/1.7

[56] References Cited

UNITED STATES PATENTS

| | | | |
|---|---|---|---|
| 2,622,027 | 12/1952 | Torr | 99/107 |
| 2,910,369 | 10/1959 | Klein | 99/159 |
| 2,924,521 | 2/1960 | Hewitt et al. | 99/1 |
| 3,037,866 | 6/1962 | Evans | 99/140 |
| 3,128,228 | 4/1964 | Michl | 195/1.7 |
| 3,224,886 | 12/1965 | Motzel et al. | 99/204 |
| 3,348,954 | 10/1967 | Green | 99/140 |
| 3,493,400 | 2/1970 | Truckenbrodt et al. | 99/204 |

*Primary Examiner*—Morris O. Wolk
*Assistant Examiner*—Stephen B. Davis
*Attorney*—William D. Hall, Elliott I. Pollock, Fred C. Philpitt, George Vande Sande, Charles F. Steininger and Robert R. Priddy

[57] ABSTRACT

Animal or vegetable tissues having no perceptible flavoring properties are soaked in an aqueous solution until the solution becomes aromatic. The aqueous solution in which the animal tissues are soaked contains sugar, vitamin and an inorganic salt while that in which the vegetable tissues are soaked contains various inorganic salts. The temperature of the solution, the illumination and atmosphere surrounding the solution, and the length of time of the soaking step are controlled. The animal or vegetable tissue employed can be lyophilized.

20 Claims, No Drawings

AROMATIC SUBSTANCES OBTAINED FROM ANIMAL OR VEGETABLE TISSUES

The present invention is concerned with processes for preparing aromatic substances from animal and vegetable tissues. The term "aromatic substance" is used in this specification to mean a substance which has an odor and/or a taste perceptible by man or by animals.

It has been shown that the various stages of the metabolic process in living organisms which leads to the formation of aromatic substances are catalysed by enzymes and practical applications have been developed from this fact as described, for example, in the paper "Enzymatic odor development" by Kurt S. Konigsbacher and Eric J. Hewitt in Proceedings of the Academy of Sciences of New York, 116(2), pages 705–710 (1964), and in U.S. Pat. No. 2,924,521 and U.S. Pat. No. 3,224,886.

I have now found that certain animal or vegetable tissues, in particular the parenchyma of vegetable shoots or the bone marrow of animals, which in themselves have no perceptible olfactive or flavoring properties, develop aroma when they are placed for a determined period and under certain conditions of temperature, illumination and atmosphere, in an aqueous bath containing in solution certain inorganic and organic compounds.

There are three possible explanations of this result:

According to a first hypothesis, catalysts, for example enzymes, and other materials necessary for the synthesis of aromatic substances are contained in the tissues used and the inorganic and organic compounds in solution in the aqueous bath provide the missing ingredients necessary for the synthesis to take place.

According to a second hypothesis, the aromatic substances are secreted by aromatic micro-organisms. The tissues used contain strains of these micro-organisms and the aqueous bath containing certain inorganic or organic compounds acts as a culture medium in which these micro-organisms develop to produce, by bio-synthesis, aromatic substances.

According to a third hypothesis, the tissues used contain molecules which do not have perceptible aromatic properties and which are concentrated or transformed into aromatic molecules by the inorganic and organic compounds in solution in the aqueous bath.

In the following description, reference will be made to the second hypothesis which seems to be the most suitable for explaining the phenomena that occur, but it is to be understood that this is done for convenience of description only and that I do not wish to be limited by any theoretical explanation.

When animal tissues are used, it is preferred to use the marrow of the principal bones, in particular the spinal marrow, of a freshly slaughtered animal.

In the case of vegetable tissues, the shoots, preferably the current seasons growth and preferably before flowering, are cut off and the parenchyma of the shoots is taken. For economic reasons, it is simpler to use crushed shoots. It should be understood that the flesh of animals or even the fruits or flowers of vegetables can also be used. The use of bone marrow and of the parenchyma of shoots is preferred because they are starting materials which present few difficulties.

The composition of the aqueous bath depends upon whether animal or vegetable tissues are treated and upon the species of the starting material.

In the case of animal tissues, they are placed, preferably less than 4 hours after slaughtering, in an aqueous bath containing in solution, per litre of soft water, the following three constituents:

a. a sugar:
  from 0.3g to 4g, preferably 1g, of glucose or from 0.9g to 12g, preferably 3g, of saccharose.
b. a vitamin:
  from 1 mg to 2g, preferably 20mg, of ascorbic acid or from 0.5mg to 1g, preferably 10mg, of carotenoids.
c. calcium phosphate:
  from 0.3g to 2g, preferably 1.5g, of dicalcium phosphate, or from 0.10g to 2g, preferably 1g, of tricalcium phosphate, or from 0.10g to 3g, preferably 0.8g, of monocalcium phosphate.

The aqueous bath may, if desired, additionally contain, per litre of water, one or more of the following constituents:
a. iron phosphate; form 1mg to 0.8g, preferably 3mg.
b. glutamic compound, for example glutamic acid or sodium monoglutamate; from 5mg to 3g, preferably 20mg.
c. gelatine; from 1g to 5g, preferably 2.5g.

When the aromatic substances obtained are to be used immediately, the aqueous bath is placed in an opaque container under a renewed nitrogen atmosphere. The container is moderately illuminated, preferably with orange light.

The bath is maintained at a temperature of from 4° to 10° C., preferably at 8° C.

After keeping the tissues in the bath for at least the minimum period required, which will vary from 12 hours to four days depending upon the animal species used and on the conditions employed, the bath is rendered aromatic.

According to another preferred method, the animal starting material is first soaked for a period of from three to sixty minutes in the previously described aqueous bath at room temperature and is then removed from the bath, drained and frozen at −40° C. The material is then dehydrated by sublimation under a pressure of less than 1 torr, the operations of freezing and dehydration under vacuum being known as lyphoilization. It will be appreciated that it is not necessary that the dehydration should be carried out immediately after freezing and the material can be stored in the frozen state for any desired period. The dehydration is carried out in such a way that the temperature of the dehydrated material does not exceed +35° C. at the end of the operation.

The lyophilized product, after storage, if desired, under inert gas in a sealed container, is added in a proportion of from 0.001 to 1.0 percent by weight to an aqueous bath as described above. The bath is then maintained under a renewed nitrogen atmosphere or an atmosphere of biologically filtered air and moderate illumination, preferably with orange light at a temperature of from 16° to 40° C., preferably at 37° C. After a period of from 12 hours to 4 days, the solution has the taste and odor of a meat juice.

To explain this result, the lyophilized product can be considered to constitute a strain of aromatic micro-organism.

The same processes are used to obtain a vegetable aroma, that is either simply by leaving the vegetable tissue starting material in an aqueous bath containing inorganic and, if desired, organic compounds, or by soaking the vegetable tissue in such a bath, then lyophilizing the material and placing the lyophilized product in an aqueous bath of the same composition under certain conditions of temperature, illumination and atmosphere.

The aqueous baths used for vegetable materials contain in solution, per litre of soft water, the following three mineral salts:
a. calcium nitrate; from 10mg to 3g, preferably 1g.
b. potassium phosphate; from 5mg to 3g, preferably 0.25g.
c. magnesium sulphate; from 5mg to 2g, preferably 0.25g.

The aqueous bath may also contain, if desired, per litre of soft water, one or more of the following constituents:
a. iron phosphate; from 1mg to 1g, preferably 2mg.
b. potassium nitrate; from 1mg to 2g, preferably 0.25g.
c. sugar; glucose from 0.1mg to 5g, preferably 40mg.
d. vitamins: ascorbic acid; from 1mg to 2g, preferably 20mg, or carotenoids; from 0.5mg to 1g, preferably 10mg.
e. glutamic compounds: glutamic acid or sodium monoglutamate; from 5mg to 3g, preferably 20mg.

Apart from the differences in the composition of the aqueous baths, in the case of the treatment of vegetable starting materials it is sufficient to use a renewed atmosphere of bacteriologically filtered air. In this case any illumination of a green color must be absolutely avoided.

When non-lyophilized vegetable materials are used to render the solution aromatic, the temperature of the bath can be from 16° to 40° C., preferably 37° C. The lyophilized products can also be added directly to liquid foodstuffs or beverages, such as fruit juices, creams, yogurts and broths, or liquid substances without flavor which are suitable for human or animal consumption, such as soya proteins, lactic proteins or proteins obtained by bio-synthesis from petroleum.

The following examples are given by way of illustration only:

EXAMPLE 1

The current season's growth of strawberry plants was cut off before flowering, the leaves were stripped off, the shoots were washed with soft water, drained and then weighed. The vegetable material weighed 225g.

Three hours after cutting, the shoots were crushed and soaked immediately, for 15 minutes, in an aqueous bath at room temperature. The bath consisted of soft water having a hydrotimetric titre of 2°5 in which were dissolved, per liter, the following constituents:

| | |
|---|---|
| calcium nitrate | 1g |
| potassium phosphate | 0.25g. |
| magnesium sulphate | 0.25g |
| iron phosphate | 0.001g |
| potassium nitrate | 0.25g |
| atomized glucose | 0.02g |
| ascorbic acid | 0.10g |

The vegetable material was removed from the bath, drained and frozen at −40° C. It was then dehydrated by sublimation under vacuum. The parameters during dehydration were as follows:

pressure: 0.2 mm Hg
temperature of condensation plate: −45° C.
temperature of heating plate: +50° C. during the first two hours then +35° C.
temperature of the lyophilized product at the end of the operation: less than +35° C.

105g of lyophilized product were obtained; it was stored in transparent plastic sachets filled with nitrogen and sealed by welding, the sachets being kept in a moderately illuminated place.

After storage for 6 months, 40g of the product, which was odorless and tasteless, were placed in 4 litres of soft water in which were dissolved, in total:

| | |
|---|---|
| calcium nitrate | 0.08g |
| potassium phosphate | 0.04g |
| magnesium sulphate | 0.04g |
| potassium nitrate | 0.008g |
| atomized glucose | 4g |
| glutamic acid | 0.04g |

This colorless solution was placed in a opaque container closed by a glazed cover, the glass being orange-colored. The air above the bath was renewed continuously with air aspirated through a bacteriological filter. The temperature of the bath was maintained at 37° C.

At the end of 72 hours, the container was opened. The solution had the odour and the taste of fresh strawberries. It was slightly rose colored.

Comparative tests have shown that it would require at least 2.500 kg of fresh strawberries to give a comparable liquor to that obtained from 225g of shoots, that is to say from a smaller quantity of a much cheaper starting material.

EXAMPLE 2

The spinal marrow of an ox which had been slaughtered less than 4 hours before was taken, the protective sheath of the marrow was removed, the marrow was washed in soft water, drained and weighed; it weighed 400g.

The marrow was soaked for 10 minutes in an aqueous bath at room temperature, the bath consisting of soft water having a hydrotimetric titre of 2°5 in which were dissolved, per litre, the following constituents:

| | |
|---|---|
| atomized glucose | 10g |
| ascorbic acid | 0.2g |
| dicalcium phosphate | 1.5g |
| sodium monoglutamate | 1g |
| gelatine 80 bloom | 2.5g |

The marrow was removed from the bath, drained and frozen at −45° C. After 24 hours, it was lyophilized. The lyophilization conditions were the same as those described in Example 1; 123g of lyophilized product were obtained. This product was stored in transparent plastic sachets, filled with nitrogen and sealed by welding, the sachets being kept in a moderately illuminated place. After storage for an extended period, less than 2 years, 40g of the lyophilized product, which was odorless and tasteless, were placed in 4 liters of water having a hydrotimetric titre of 2°5 in which were dissolved, in total, the following constituents:

| | |
|---|---|
| atomized glucose | 4g |
| ascorbic acid | 2g |
| calcium phosphate | 4g |
| iron phosphate | 8mg |
| glutamic acid | 0.08g |

This solution was placed in an opaque container which was closed with a glazed cover, the glass being orange colored. The container was placed in a moderately illuminated place. The atmosphere above the bath was continuously renewed with air aspirated through a bacteriological filter. The temperature of the solution was maintained at from 18° to 30° C. At the end of 36 hours, the container was opened. The solution which had been colorless had taken on a light yellow tint and it had the odor and the taste of beef.

Comparative tests have shown that to obtain by conventional methods the same quantity of solution that can be rendered aromatic with 1 kg of bone marrow, it would be necessary to use more than 1,000 kg of beef.

Numerous experiments carried out in the laboratory have shown that these results are reproducible.

What I claim is:

1. A process for the production of aromatic substances which comprises placing vegetable tissues, which in themselves have no perceptible olfactive or flavoring properties, in an aqueous solution containing calcium nitrate, potassium phosphate, and magnesium sulphate and maintaining the solution under a renewed atmosphere of bacteriologically filtered air and light which is not of green coloration at a temperature of from 16° to 40° C. for a minimum period of from 12 hours to 4 days until the solution is aromatic.

2. The process of claim 1 wherein said aqueous solution contains per liter of soft water, at least the three following inorganic constituents:
   a. calcium nitrate: from 10mg to 3g
   b. potassium phosphate: from 5mg to 3g
   c. magnesium sulphate: from 5mg to 2g.

3. The process of claim 2 wherein the solution is maintained at a temperature of 37° C.

4. The process of claim 2 wherein the light is orange colored light.

5. The process of claim 2 wherein the aqueous solution additionally contains per liter of soft water, at least one of the following constituents:
   a. iron phosphate; from 1mg to 1g.
   b. potassium nitrate; from 1mg to 2g.
   c. sugar; from 0.1mg to 5g.
   d. vitamin; from 0.5mg to 2g.
   e. glutamic compound; from 5mg to 3g.

6. A process for the production of aromatic substances which comprises soaking vegetable tissues which in themselves have no perceptible olfactive or flavoring properties in an aqueous solution containing calcium nitrate, potassium phosphate, and magnesium sulphate at room temperature for from 3 to 60 minutes and then removing, draining, and lyophilizing the tissues and thereafter adding the lyophilized product to an aqueous solution containing calcium nitrate, potassium phosphate, and magnesium sulphate, and maintaining the solution under a renewed atmosphere of bacteriologically filtered air and light which is not of green coloration at a temperature of from 16°–40° C. for a minimum period of from 12 hours to 4 days until the solution is aromatic.

7. The process of claim 6 wherein both of said aqueous solutions contain per liter of soft water, at least the three following inorganic constituents:
   a. calcium nitrate: from 10mg to 3g
   b. potassium phosphate: from 5mg to 3g
   c. magnesium sulphate: from 5mg to 2g.

8. The process of claim 6 wherein said lyophilized product is added to said solution in a proportion of from 0.001 to 1 percent by weight.

9. The process of claim 8 wherein both of said aqueous solutions contain per liter of soft water, at least the three following inorganic constituents:
   a. calcium nitrate: from 10mg to 3g
   b. potassium phosphate: from 5mg to 3g
   c. magnesium sulphate: from 5mg to 2g.

10. The process of claim 8 wherein the solution containing the lyophilized product is maintained at a temperature of 37° C.

11. The process of claim 8 wherein the vegetable tissues are the parenchyma of shoots.

12. A process for the production of aromatic substances which comprises soaking animal tissues which in themselves have no perceptible olfactive or flavoring properties in an aqueous solution containing at least one sugar, at least one vitamin, and calcium phosphate; and maintaining the solution under a renewed atmosphere of nitrogen and light at a temperature of from 4° to 10° C. for a minimum period from 12 hours to 4 days until the solution is aromatic.

13. The process of claim 12 wherein said tissues are tissues of a freshly slaughtered animal; and where said aqueous solution contains per liter of soft water, at least the following three constituents:
   a. a sugar; from 0.3g to 12g.
   b. a vitamin; from 0.5mg to 2g.
   c. a calcium phosphate; from 0.1g to 3g.

14. The process of claim 13 in which the solution is maintained at 8° C.

15. The process of claim 13 wherein the light is orange colored light.

16. The process of claim 13 wherein the aqueous solution additionally contains, per liter of soft water, at least one of the following constituents:
   a. iron phosphate; from 1mg to 0.8g.
   b. gelatine; from 1g to 5g.
   c. glutamic compound; from 5mg to 3g.

17. A process for the production of aromatic substances, which comprises soaking animal tissues, which in themselves have no perceptible olfactive or flavoring properties, in a solution containing at least one sugar, at least one vitamin, and calcium phosphate for from 3 to 60 minutes at room temperature and then removing, draining, and lyophilizing the tissues; and then adding the lyophilized product to an aqueous solution containing at least one sugar, at least one vitamin and calcium phosphate; and maintaining the solution under a renewed atmosphere of nitrogen or bacteriologically filtered air and light at a temperature of from 16°–40° C. for a minimum period from 12 hours to 4 days until the solution is aromatic.

18. The process of claim 17 wherein said lyophilized product is added to said solution in a proportion of from 0.001 to 1 percent by weight.

19. The process of claim 17 wherein the solution containing the lyophilized product is maintained at a temperature of 37° C.

20. The process of claim 17 wherein the animal tissues are spinal bone marrow.

* * * * *